INVENTOR.
ROUZAS R. KHOYLIAN

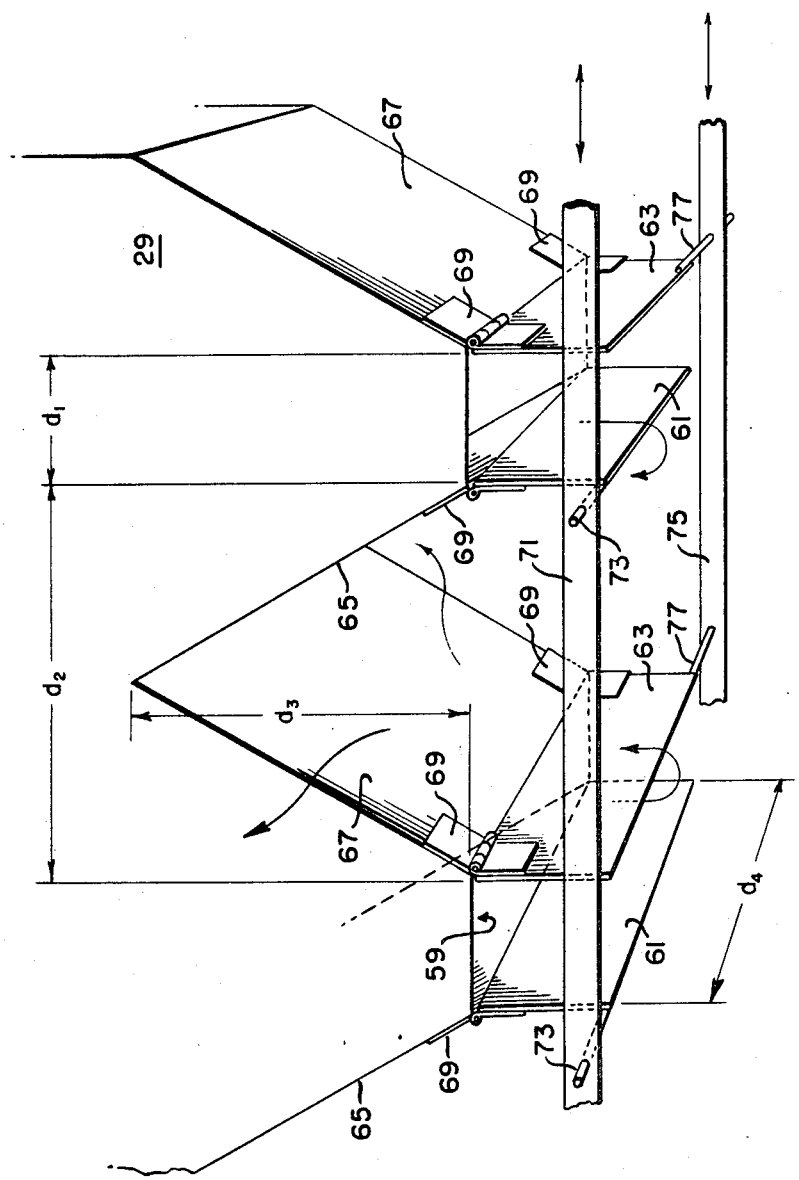

July 23, 1968  R. R. KHOYLIAN  3,393,532
REFRIGERATED CONVEYOR SYSTEM
Filed Oct. 20, 1966  6 Sheets-Sheet 4
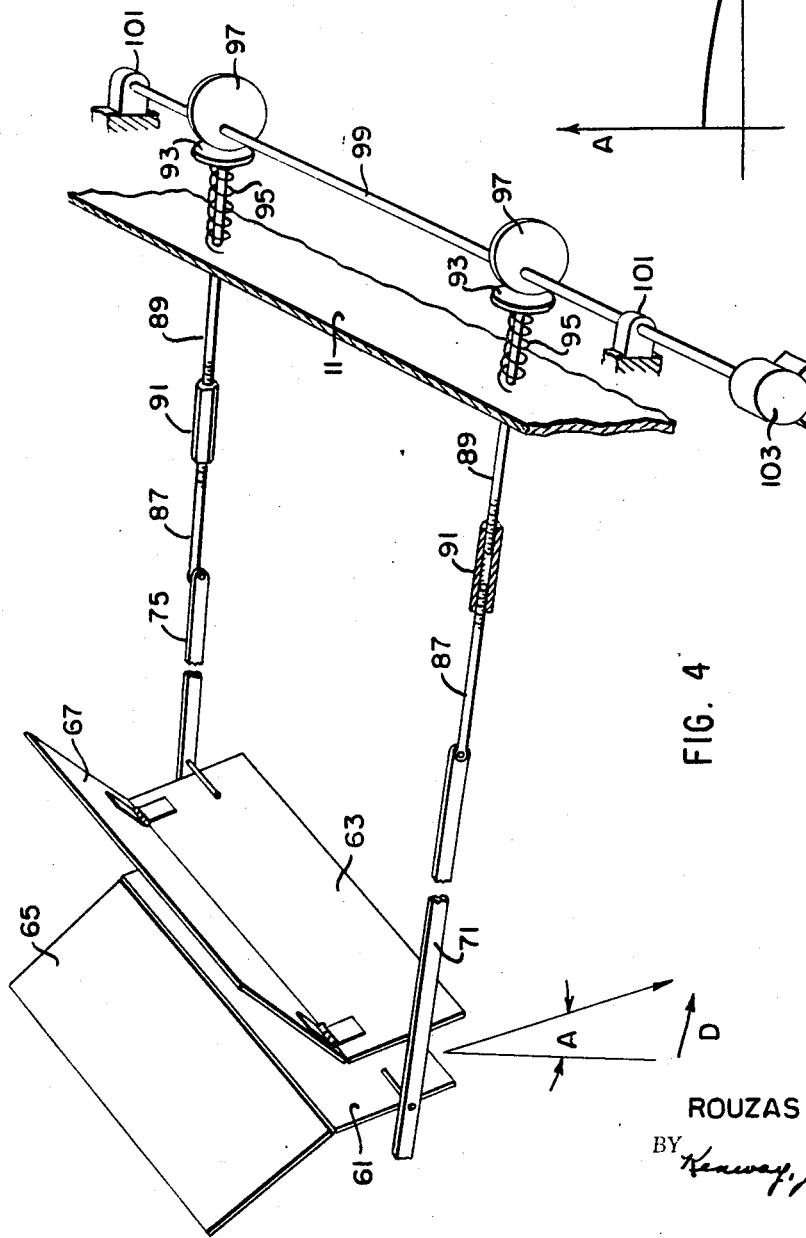
INVENTOR.
ROUZAS R. KHOYLIAN
BY Kenway, Jenney & Hildreth
ATTORNEYS July 23, 1968 R. R. KHOYLIAN 3,393,532
REFRIGERATED CONVEYOR SYSTEM
Filed Oct. 20, 1966 6 Sheets-Sheet 5
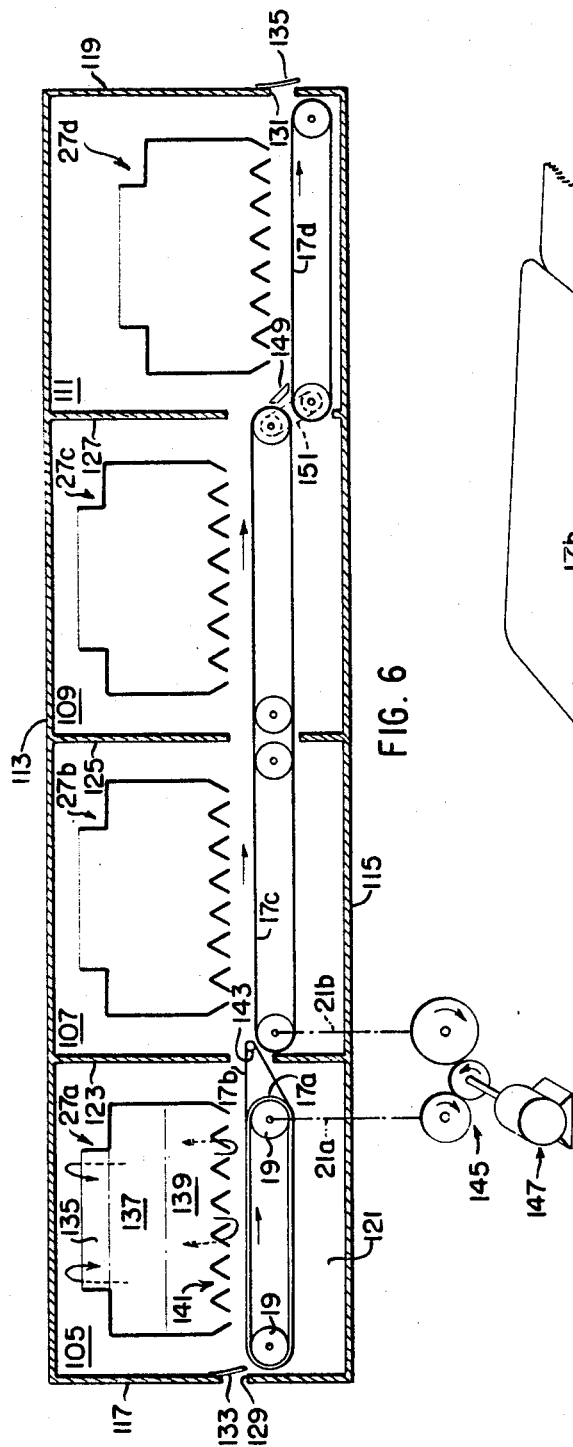
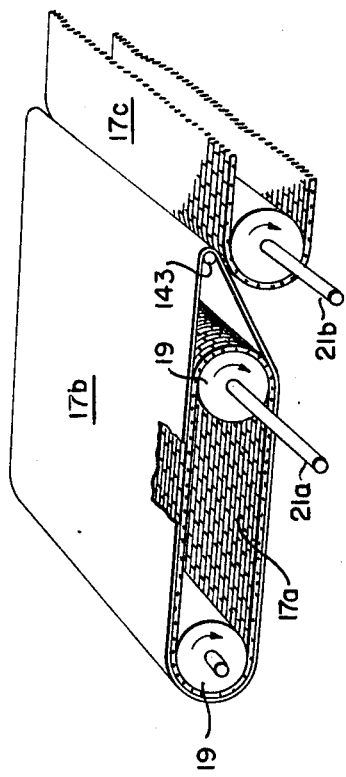
INVENTOR.
ROUZAS R. KHOYLIAN
BY
ATTORNEYS

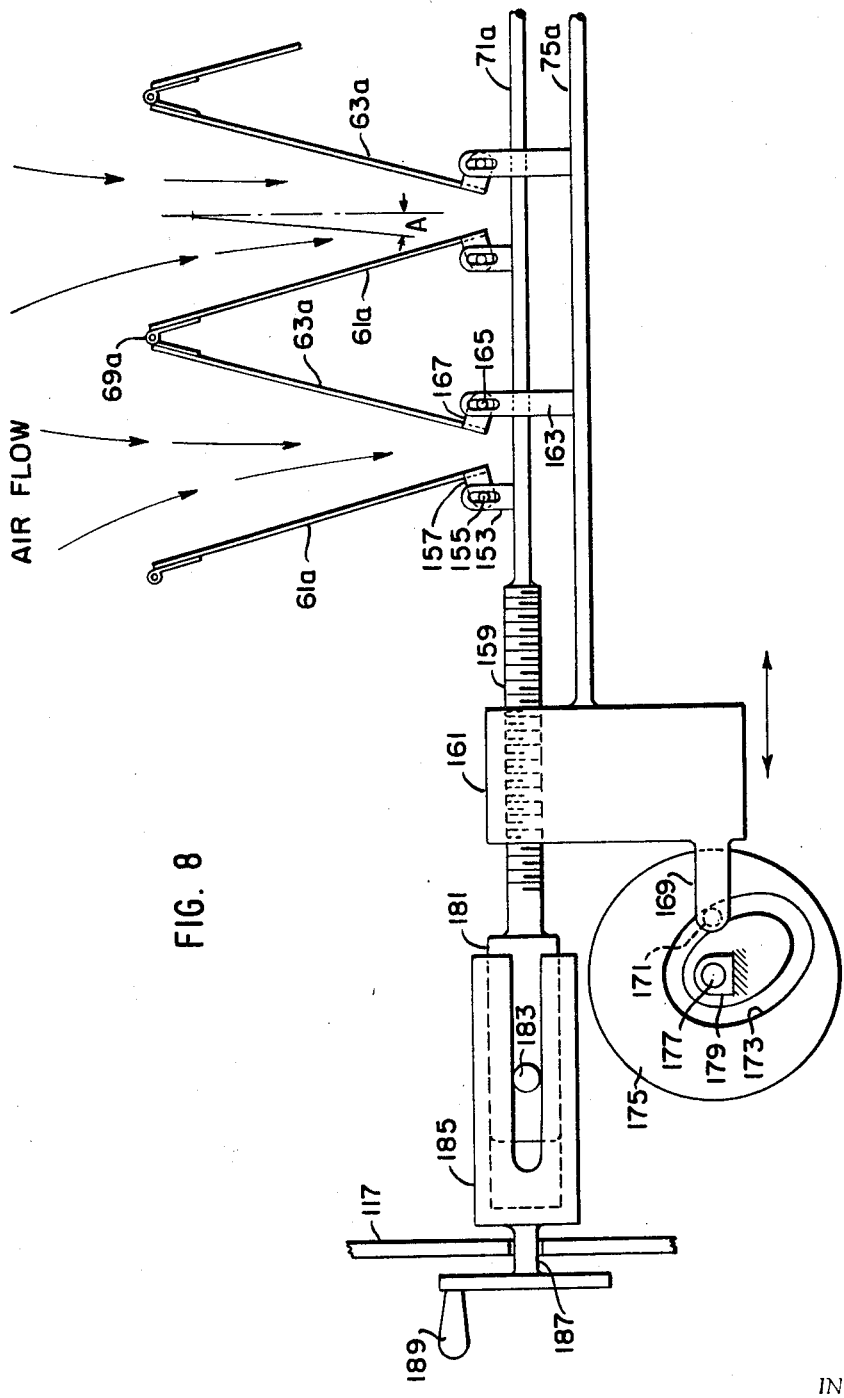

United States Patent Office 3,393,532
Patented July 23, 1968

3,393,532
REFRIGERATED CONVEYOR SYSTEM
Rouzas R. Khoylian, Belmont, Mass., assignor to Design
+ Process Engineering Inc., Waltham, Mass., a corporation of Massachusetts
Filed Oct. 20, 1966, Ser. No. 588,085
18 Claims. (Cl. 62—380)

ABSTRACT OF THE DISCLOSURE

A refrigerating system comprising one or more modules each including an insulated passage, a conveyor in the passage to move products to be refrigerated through the passage, and a cold air generator in the passage, in which the cold air generator comprises adjustable air outlet nozzles each elongated in directions perpendicular to the direction of movement of the conveyor and connected together for simultaneous adjustment to facilitate control over temperature and exit air speed.

---

My invention relates to heat transfer, and more particularly to a novel refrigerating system.

In response to the growing demand for frozen perishable goods, and particularly food products and the like, various freezing processes have been developed. Of these, two are in widespread use; one involves flash freezing with liquid nitrogen, and the other comprises refrigeration with cold air.

The liquid nitrogen freezing process produces a product of excellent quality, but at a comparatively high cost. The reasons for the high cost of the liquid nitrogen process are of a fundamental nature. First, there is the cost of producing, storing and handling liquid nitrogen. Second, in order to produce a product of the desired quality, it is necessary to contact the unfrozen product with the liquid nitrogen. Since most food products contain a very high percentage of water, most of the heat transferred in the freezing process is the latent heat of fusion of water, exchanged at substantially 32° F. It is highly inefficient, economically, to use liquid nitrogen for heat transfer at that temperature.

The air freezing processes that have been developed are somewhat more economical, but still leave much to be desired by way of efficiency, and are unsuited to the production of a frozen product of high quality. For example, a demand has developed for products, such as frozen shrimp and the like, in which individual pieces are hard frozen, dry and separate and have a very thin glaze of ice on them. Separation of the pieces is particularly desirable in the case of goods sold in quantity, as to restaurants, where it is desired to use only a portion of a quantity at a time without thawing the entire batch, or breaking off a portion of a batch with attendant damage to the product. A number of difficulties are encountered when this result is sought to be achieved in prior air freezing processes. The individual pieces tend to become frozen together in a lump, and to freeze to the refrigerating apparatus, requiring difficult and expensive removal operations that generally result in broken and wasted product. Another problem in the use of conventional air freezing processes is that the required apparatus for continuous freezing occupies considerable space. A system of conveyor belts in a freezing tunnel is normally employed, in which the belt carrying the product to be frozen carries the product into contact with cooling streams of air. It would be highly desirable, for economy of space, to employ a relatively wide belt and a relatively short tunnel. However, it has been found that prior apparatus cannot be designed for use with wide belts because pockets of warm air tend to accumulate and cause uneven heating. The minimum length of the tunnels is limited by the relative air speed that the product can stand. Light, small articles such as shrimp, breaded fish sticks, or the like are blown about and damaged by relatively low air speeds, so that the tunnels tend to be quite long. The objects of my invention are to increase the efficiency of air refrigeration, while reducing the cost, and to make possible the production of a frozen product of high quality by cold air refrigeration.

The above and other objects of my invention may be attained by a novel refrigerating system of my invention in which high aerodynamic and thermal efficiency makes possible the very rapid production of high quality frozen products. Briefly, the apparatus comprises a cold air generator consisting of a flow passage, an air pump such as a fan arranged to force air through the passage, and air cooling means such as a set of refrigerating coils or the like located in the passage to cool the air stream. At the exit end of the passage are arranged a row of nozzles having parallel elongated nozzle ports of adjustable size. The nozzle construction is such that formed between each pair of nozzle ports is an air return duct. The cold air generator is located above a conveyor belt in an insulated passage, and the product to be frozen is placed on the belt so that it passes under the nozzles in a direction normal to the sense of their elongation. Air exiting from the elongated nozzles contacts the product to be frozen and extracts heat therefrom, and then returns along the return ducts between the nozzles and between the sides of the cold air generator and the insulated passage to the inlet of the fan. Preferably, the nozzles are made adjustable so that their direction and size can be controlled. For delicate products, means are preferably provided for cyclically controlling the direction of the nozzles so that they are swept back and forth along the line of travel of the material placed on the conveyor belt for more efficient heat transfer contact without the use of a sufficiently high air speed to dislodge the product. By varying the size of the nozzle ports, a balance of air speed, air mass flow rate, air direction and exit air temperature suited for the particular product to be refrigerated can be obtained.

Freezing apparatus of the type just described may be made in a series of modules each comprising an insulated passage including a cold air generator and a conveyor of the type described. Such modules may be connected in series for increased heat exchange capacity. In accordance with a preferred embodiment of my invention, particularly useful for the production of high quality food such as frozen shrimp, I provide a series of such refrigerating modules. The first module has a conveyor belt driven at a higher speed than the belts of the succeeding conveyors. The belt in the first section is preferably made of an insulating, water repellant material, such as polytetrafluoroethylene or the like. Such a belt is less efficient as a heat transfer surface, because a product entering the first section is primarily cooled from above. However, it has the decided advantage that the frozen product will not freeze to the belt, as when a conventional metal belt is employed.

The refrigerating apparatus in the first section is arranged to remove sufficient heat to "case-freeze" the product so that the particles of product at the exit end of the first section are dry. The increased speed of operation of the first conveyor relative to the later conveyors makes it possible to space the food pieces apart on the first belt, and yet allow them to be in contact for more efficient operation in the later sections after they have been frozen to dryness.

When it is desired to produce a glazed product, it is necessary first to cool the frozen product to a very low temperature, so that when it is sprayed or dipped in water to form the glaze, the final temperature will still be that of a hard frozen product. For this purpose, and in accordance with a preferred embodiment of my invention, the last section of the modular refrigerating apparatus is made to operate at a very low temperature with respect to the temperature in the earlier sections. In order to reduce the demands on this last section, the previous sections are adjusted to remove all of the latent heat from the product so that only sensible heat is required to be removed in the last stage. Accordingly, efficient utilization of the refrigerating apparatus is attained.

The apparatus of my invention will best be understood in the light of the following detailed description, together with the accompanying drawings, of various illustrative embodiments thereof.

In the drawings,

FIG. 3 is a fragmentary perspective sketch of a portion of the apparatus of FIGS. 1 and 2;

FIG. 4 is a schematic sketch of apparatus for controlling the nozzle openings in the apparatus of FIGS. 1-3;

FIG. 5 is a graph illustrating the operation of the apparatus of FIG. 4;

FIG. 6 is a diagrammatic sketch of a multiple stage refrigerating system in accordance with a preferred embodiment of my invention;

FIG. 7 is a schematic orthogonal sketch of a portion of the apparatus of FIG. 6; and FIG. 8 is an elevational view of a portion of a modified form of my invention incorporating apparatus for cyclically controlling and periodically adjusting the nozzles in the refrigerating system of FIG. 6.

Figure 1:
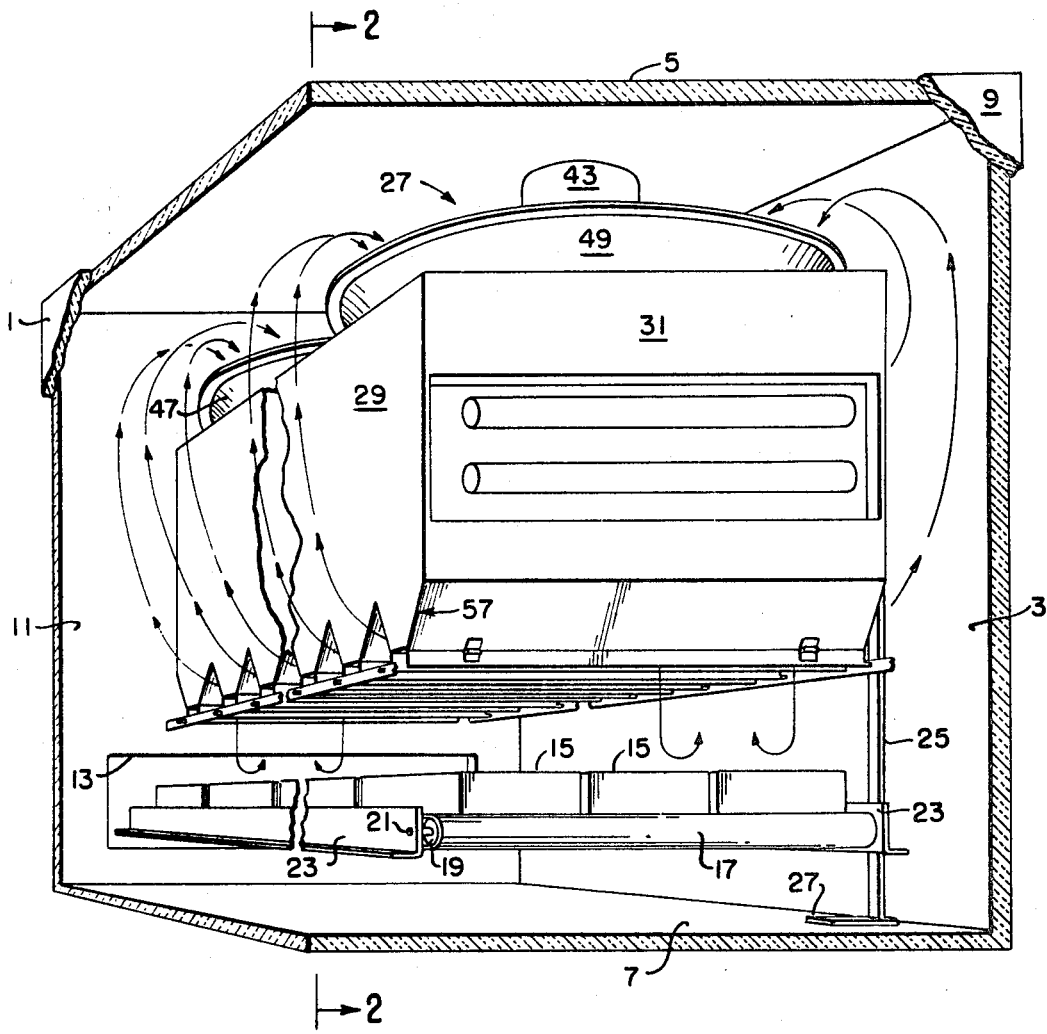
FIG. 1 is a perspective sketch, with parts broken away, of a refrigerator module in accordance with my invention.

Referring to FIG. 1, the refrigerating system of my invention comprises an outer insulated passage defined by side walls 1 and 3, upper and lower walls 5 and 7 and end walls 9 and 11. These walls are of insulating material, such as polyurethane foam between outer covering layers of Fiberglas (epoxy resin filled with glass fibers) or aluminum. The walls may be secured together in any suitable conventional manner, not shown. Each of the end walls 9 and 11 is provided with an aperture, as indicated at 13 in the end wall 11, to allow the passage of the product to be refrigerated, here illustrated as packages 15, to pass through the outer passage on a conveyor belt 17. The belt 17 is mounted on rolls such as 19 fixed on shafts such as 21 journalled in a suitable support, here shown as a pair of rails 23 of structural steel or the like, supported from the bottom wall 7 by any conventional means, such as a series of uprights 25 connected to brackets such as 27 on the bottom wall 7. The rolls 19, and hence the belt 17, may be arranged to be driven by any conventional motor connected by conventional gearing, not shown, to one of the shafts 19. The belt 17 is preferably of the conventional metal mesh variety, where the product is packaged as at 15 or is otherwise dry, as better heat transfer is obtained when the product is carried on a thermally conductive surface. However, if the product is initially wet, as in the specific embodiment to be described below, the belt 17 is preferably of a water-repellant insulating material, such as polytetrafluoroethylene or the like.

The belt 17 may be of any desired width, but conveniently may be 5 or 6 feet in width. The insulated passage is preferably wide enough so that a man can walk between the rails such as 23 and the adjacent walls such as 1 and 3 of the freezing apparatus. For this purpose, insulated access doors may be placed where convenient in the walls.

Figure 2:
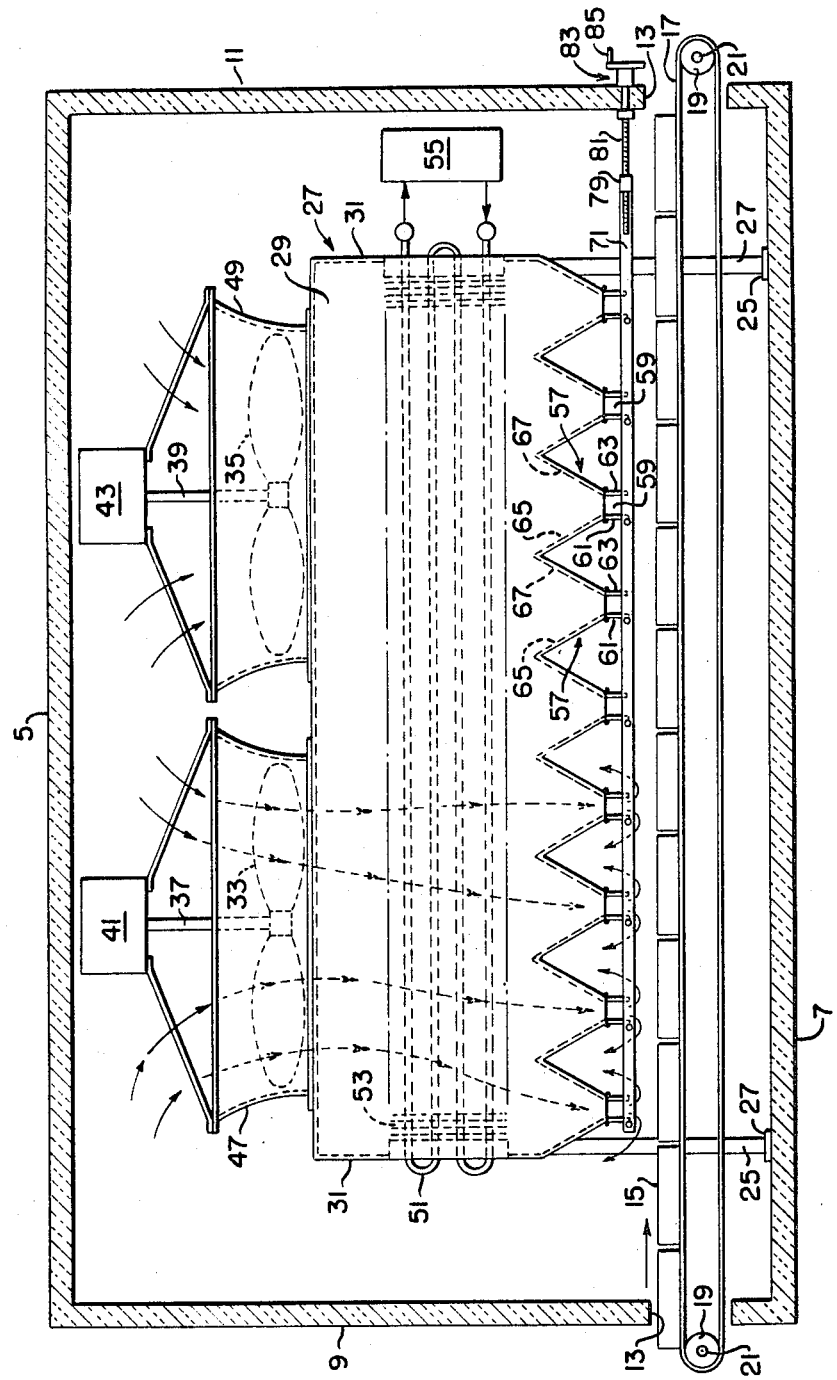
FIG. 2 is a cross-sectional elevation of the apparatus of FIG. 1, taken substantially along the lines 2—2 in FIG. 1.

Within the insulated passage is a cold air generator generally designated as 27. The generator 27 comprises side walls such as 29 and end walls such as 31 of galvanized sheet metal or the like, defining an air flow passage. At least one air pump is provided to force air into the passage so formed. As best shown in FIG. 2, there are provided for this purpose a pair of fans 33 and 35 having drive shafts 37 and 39 arranged to be driven by conventional electric motors 41 and 43. The motors 41 and 43 are mounted by brackets such as 45 to cowlings 47 and 49 comprising an extension of the passage formed by the walls 29 and 31.

Within the passage defined by the walls 29 and 31 is a heat exchanger comprising a set of refrigerating coils 51 of any conventional construction, provided with fins such as 53 located with any convenient spacing apart, such as 3 fins per inch, to provide good heat exchange while at the same time permitting a reasonable period of operation without defrosting. The coils 51 are supplied in a conventional manner with a refrigerant such as ammonia or Freon ($CCl_2F_2$) from a conventional compressor schematically indicated at 55. For reasons of heat economy, the compressor 55 would preferably be located outside of the insulated passage.

At the lower end of the passage defined by the walls 29 and 31 are a set of adjustable nozzles generally designated as 57 having elongated parallel apertures extending across the outer insulated passage normal to the direction of movement of the articles 15 on the belt 17. Each such aperture 59 is defined by a pair of adjustable wall members 61 and 63 each adjustably secured to a fixed wall portion extending across the end of the passage defined by the walls 29 and 31. Thus, the adjustable portions 61 are secured to fixed wall segments 65 and the depending wall portions 63 are connected to wall portions 67 extending across the passage. As best shown in FIG. 3, the adjustable portions such as 63 are secured to the corresopnding fixed wall portions such as 67 by conventional means such as the hinges 69 shown. As indicated, the adjacent wall portions such as 65 and 67 are connected together to form a triangular passage extending across the cold air generator, and this passage serves as a warm air return duct for cold air exiting from the apertures 59, blowing down onto the product carried on the belt 17, and then returning to the intake of the fans.

With reference to FIG. 3, the basic characteristic dimensions of the nozzles are $d1$, $d2$, $d3$ and $d4$. The ratio of the distances $d1$ and $d2$ is selected to produce a flow rate, temperature and air speed approximately correct for the product to be cooled and cooling operation to be performed. In general, as $d1$ is made smaller, $d3$, the height of the return channel, is made larger. As $d4$, the width of the nozzles, is made larger, the area of the return nozzles, proportional to $d2 \times d3$, should be increased. Actual dimensions for any particular application can readily be determined by conventional engineering design procedures.

In view of the flow restriction produced by the nozzles 57, the lower end of the passage defined by the walls 29 and 31 acts as a plenum chamber, in which the air pressure is somewhat higher than the outer air pressure because of the action of the fans 33 and 35 and the restriction of the nozzle orifices. It will be seen that by controlling the position of the wall portions 61 and 63, the direction of the emergent air stream, its velocity, and its mass rate of flow can be controlled. At the same time, over ranges depending on the capacity of the heat exchange coils 51 and the fans 33 and 35, the temperature and air speed of the exit air can also be controlled.

In order to control the size and direction of the nozzle apertures, the adjustable wall portions 61 are connected together by means of an adjusting bar 71 connected pivotally to each of the depending wall portions 61 by means of a pin 73 journalled in the connecting bar, and welded or otherwise secured to the wall portions 61. The opposing adjustable wall portions 63 are also connected to a connecting bar 75 by means such as the pins 77. It will be apparent that by moving the connecting bars 71 and 75 in the same direction, the direction of the nozzles can be controlled, whereas by moving them in opposite directions, the size of the nozzle apertures can be controlled.

For many purposes, it may be sufficient simply to set the size and direction of the nozzles by relative adjustment of the connecting bars 71 and 75. As indicated in FIG. 2, that may be accomplished by providing each of the bars such as 71 with a nut such as 79 at one end thereof and cooperating with a screw 81 journalled in the wall 11 as indicated schematically at 83 so that the relative position of the bar can be adjusted by means such as a crank 85.

Alternatively, and where higher efficiency is essential and a more delicate product is to be treated, such as one readily blown about by high air speeds, an arrangement such as that shown in FIG. 4 is preferred. The purpose of the arrangement is to cyclically adjust the direction of the nozzles while allowing a manual relative adjustment of the size of the openings. As shown, the rods 71, 75 are connected through links 87 to cam followers 89 by adjustable means such as the nuts 91 shown. As schematically illustrated, the cam followers may have heads 93 driven away from the walls 11 by springs 95 and toward the walls 11 by cams 97. Cams 97 may be affixed to a shaft 99 journalled in suitable supports indicated at 101 and driven by a conventional electrical motor 103. As indicated in FIG. 5, the angle A made by the direction of the nozzle opening with the direction of the normal to the moving belt is made to change with respect to time, by appropriate shaping of the cams 97, so that the nozzles are swept more rapidly forward with respect to the direction d of travel of the product on the belt under the nozzles than they are swept backwardly to limit the maximum relative velocity to a value that will not disturb the product. At the same time, a relative washing action is introduced which aids in effecting more efficient heat transfer between the air stream and the product.

FIGS. 6 and 7 illustrate a preferred embodiment of my invention for use in the rapid freezing of delicate products that are to be glazed. Basically, the apparatus comprises four modules, 105, 107, 109 and 111. Each of the modules is generally of the same construction, with differences to be described below. The interconnected modules form a continuous passage, which in practice would be formed by wall sections bolted together by conventional means, not shown, and comprising an upper wall 113, a lower wall 115, end walls 117 and 119, a side wall 121, and a corresponding side wall, not shown. Intermediate end walls 123, 125 and 127, forming partitions between the sections, are preferably of somewhat lighter material than the outer walls. For example, in a particular embodiment of my invention designed to freeze 1500 pounds of shrimp per hour, the outer walls were made of three inch thick insulating material, and the inner partitions such as 107, 109 and 111 were of one inch thickness. The entrance port 129 and the exit port 131 were each provided with curtains of flexible insulating material, as at 133 and 135, to provide additional insulation. For the particular embodiment referred to, the height was 7 feet, 9 inches, not including risers, not shown, comprising legs for holding the bottom wall 115 about 1 foot above the ground. The width of the outer passage was 10 feet, the length of each of the first three sections 105, 107 and 109 was 14 feet, and the length of the last section was 7 feet. The first three sections 105, 107 and 109 were operated at −25° F., and the last section 111 was operated at −50° F. Each module included a cold air generating unit such as 27a, 27b, 27c and 27d of the type described in connection with FIG. 1, and having fans driven by a five horsepower motor. In practice each such cold air generating unit such as the unit 27a comprises a pump section 135, a cooling section 137, a plenum chamber 139, and a nozzle section 141, of the type described in connection with the apparatus of FIG. 1. The arrangement of the ducting in the pump and cooling sections 135 and 137 may be varied to suit the particular fans or cooling units selected, and for example the fans could be made of the horizontal intake type rather than the vertical intake type already shown in FIG. 1. The characteristic feature of importance, however, is the vertical plenum section 139 and the arrangement of the nozzles in section 141 with elongated openings parallel to the planes of the conveyor belt and normal to the direction of travel of the product thereon.

In the first section 105, the conveyor is modified to prevent pieces of product from freezing together. For this purpose, a dual belt assembly best shown in FIG. 7 is employed. On the rolls 19, as described in connection with FIG. 1, a first belt 17a is mounted, the belt 17a being of the conventional metal mesh construction suggested in FIG. 7. Over this metal mesh belt is carried a plastic belt of polytetrafluoroethylene or the like, such, for example, as the plastic film sold under the trade name Armalon. The belt 17b is carried beyond the rolls 19 over a small idler roll 143, journalled in the side frames in a conventional manner, not shown, to form a product output ledge of very small radius to provide efficient delivery of the product onto the next belt 17c in the section 107. By means of the gearing schematically shown at 145 in FIG. 6, the drive shaft 21a of the roll 19 for the belts 17a and 17b is driven at a faster rate than the corresponding belt 17c in the section 107. The gearing 145 is driven by a conventional electric motor 147, as suggested in FIG. 6. By that arrangement, the shrimp can be placed in separated spaced relationship on the belt 17b and be carried through the first section 105 for initial surface freezing of the shrimp without contact between the shrimp or freezing to the belt. It is not necessary to fasten the plastic belt 17b to the metal belt 17a, as the pressure of the cold air coming out of the nozzles of the cold air generator 27a is sufficient to keep the plastic belt in driving contact with the metal belt.

The conveyor belt for the sections 107 and 109 may comprise a single continuous endless belt 17c. As indicated, it is driven by means of a shaft 21b at a lower speed than the belt 17b, such that the product tends to bunch together and proceeds thereafter at a slower pace.

The belt 17d in the final stage 111 may be located slightly below the belt 17c to facilitate transfer of the product from one belt to the other. If desired, a ramp 149 may be disposed adjacent the juncture of the two belts to facilitate the transfer of product. The belt 17d may be driven with the belt 17c, as by a chain 151 connected between the drive shafts of the two conveyors.

FIG. 8 illustrates certain modifications of the apparatus incorporated in the freezing system of FIGS. 6 and 7 to facilitate cyclic adjustment of the nozzles. As shown, the nozzles for the cold air generators such as 27a and 27b in FIG. 6 are formed in accordance with this embodiment by hinging adjustable wall members such as 61a and 63a directly together, without intervening fixed walls. Thus, each adjacent pair of adjustable wall members 61a and 63a is secured together by a hinge 69a. The connecting rods 71a and 75a are both mounted on the same side of the apparatus, and for that purpose the rod 71a is connected to the member 61a by slotted ears such as 153 cooperating with pins such as 155 mounted on ears 157 secured to the members 61a. The rod 71a is provided with a threaded extension threadedly engaged with a mating threaded recess in a block 161 to which the other connecting rod 75a is secured. The rod 75a is connected to the wall portions 63a by means of slotted ears 163 on the rod 75a cooperating with pins 165 secured to ears 167 on the wall portions 63a.

The block 161 is provided with an extension 169 carrying a cam follower pin 171 riding in a cam slot 173 formed in a cam 175. The cam 175 is fixed on a drive shaft 177, the latter being journalled in a suitable bearing support schematically indicated at 179 that is attached to the frame. The shaft 177 may be driven by a motor in the manner illustrated in FIG. 4.

Beyond the threaded portion 159 of the shaft 71a is a cylindrical projection 181 to which is fastened a pin 183. The pin 183 cooperates with a slotted collar 185 having a shaft extension 187 journalled in the wall 117. A crank 189 is provided for manual adjustment of the rotated angle of the collar 185 to adjust the position of the rod 171a relative to the rod 75a to determine the extent of the width of the nozzle apertures between the wall members 61a and 63a. In operation, the shaft 177 is rotated at a constant speed to vary the direction of the nozzles back and forth over the product on the belts 17b, 17c and 17d in FIG. 6 to cause a washing contact of the cold air with the product.

In the operation of the apparatus of FIGS. 6, 7 and 8, with the fans in operation and the refrigerating coils in the cold air generating unit such as 27a being supplied with a refrigerant, and the apparatus essentially in thermal equilibrium, the conveyor motor 147 is started and the motor driving the shaft 177 in FIG. 8 is started. Moist shrimp at room temperature is then deposited on the belt 17b at such a rate that the individual shrimp cannot come into contact. Substantially all of the surface latent heat in the shrimp will be removed in the first section 105, such that the shrimp are deposited on the belt 17c in a substantially dry frozen state. In the sections 107 and 109, the balance of the latent heat and sensible heat is removed until the shrimp approach the cold air temperature of −25° F. maintained in those sections. At that temperature, they are deposited on the belt 17d in the section 111, which is maintained at −50° F. The shrimp leaving the last section are then at such a low temperature that they may be sprayed or quickly dipped in water, whereupon they will acquire a thin hard glaze of ice that will protect them from loss of moisture in storage.

While I have described my invention with respect to the details of various illustrative embodiments thereof, many changes and variations will occur to those skilled in the art upon reading my description, and such can obviously be made without departing from my invention.

Having thus described my invention, what I claim is:

1. Refrigerating apparatus, comprising an insulated chamber, wall means forming a passage in and spaced from said chamber, said passage extending from an entrance end to an exit end and being directed downwardly at said exit end, means for supporting material to be cooled below, adjacent and confronting the exit end of said passage, an air pump in said passage to force air therethrough from said entrance end toward said support means, air cooling means in said passage to cool air flowing therethrough, adjustable nozzles having elongated parallel nozzle ports of variable width mounted transversely across the exit end of said passage and forming air return ducts between said nozzle ports, and adjusting means connecting said nozzles together for simultaneous adjustment of the width of said ports, said support means comprising a conveyor in and extending across said chamber and below said nozzle and driving means for said conveyor to carry articles placed thereon across said chamber under said nozzles in a direction perpendicular to said nozzle ports.

2. The apparatus of claim 2, in which said nozzles comprise spaced pairs of connected downwardly diverging walls extending across said passage, each of said walls having at least a portion movable in a sense normal to the nozzle ports formed between adjacent spaced pairs of walls, said adjusting means comprising first means connecting the movable portion of one wall of each pair together for simultaneous movement, and second means connecting the movable portion of the other wall of each pair together for simultaneous movement, whereby the width and direction of said nozzles can be adjusted.

3. The apparatus of claim 2, further comprising cyclic drive means connected to said first and second connecting means to periodically vary the direction of said nozzles.

4. Refrigerating apparatus, comprising an insulated chamber, a conveyor mounted in said chamber to carry material to be refrigerated through said chamber, and a first heat exchanger mounted above said conveyor in said chamber, said first heat exchanger comprising wall means forming a passage within said chamber, spaced therefrom, and confronting material on said conveyor, air moving means located at the end of said passage away from said conveyor for forcing air into said passage toward said conveyor, a second heat exchanger located within said passage in heat exchange relation with air moving therethrough, means for supplying cooling fluid to said second heat exchanger, a set of nozzles located at the end of said passage confronting said conveyor, said nozzles comprising adjustable wall means forming a series of parallel nozzle openings of variable width across said passage normal to the direction of movement of material on said conveyor and intermediate air return passages between the nozzle openings, and adjusting means connecting said nozzles together for simultaneous adjustment of the width of said openings.

5. In refrigerating apparatus, a set of insulated passages connected in series, a belt conveyor located in each passage, said conveyors being in adjacent series relationship to continuously move material from an entrance end of a first passage at one end of said series to the other end of said series, in which the belt conveyor in said first passage comprises a belt of insulating material and in which the other belt conveyors comprise belts of metal, and refrigerating means in each passage for producing cold air and directing the cold air on material carried on said belts, the refrigerating means in the last passage in said series being adjusted to produce air at a substantially lower temperature than the temperature of the air produced by the refrigerating means in the first passage.

6. The apparatus of claim 5, further comprising means for driving the belt conveyor in said first passage at a first speed and means for driving the belt conveyors in the other passages at a second speed lower than said first speed.

7. Deep freezing apparatus for producing hard frozen, individual, dry pieces of food from moist pieces of unfrozen food having a relatively high moisture content, said apparatus comprising, first wall means forming an insulated passage extending from an entrance end to an exit end, a series of conveyors located in said passage in sequentially adjacent relationship to convey pieces of food from said entrance end to said exit end, said conveyors comprising a first endless belt conveyor located in said passage adjacent said entrance end, said first conveyor comprising a first endless belt of insulating material, drive means connected to said first belt for driving it at a first speed, first cold air refrigerating means located in said passage above said first belt for producing cold air and directing it toward said belt, said cold air being produced at a first temperature sufficiently low to freeze the outer surface of pieces of unfrozen food, the rest of said conveyors comprising endless belts of metal and means for driving said metal belts at a speed lower than the speed of said first belt, and additional cold air refrigerating means in said passage above said metal belts for producing and directing cold air toward said metal belts, at least that one of said refrigerating means nearest the exit end of said passage being adjusted to produce cold air at a second temperature substantially lower than said first temperature.

8. The apparatus of claim 7, in which said cold air refrigerating means each comprises second wall means defining a second passage terminating in a vertical section above and confronting the associated belt, an air pump in said second passage to force air toward the belt, air cooling means in said second passage, and a series of elongated parallel nozzle ports extending normal to the direction of movement of food on the belts formed by third wall means extending horizontally across the lower end of said vertical section of said second passage, said third wall means comprising spaced pairs of adjacent connected downwardly divergent walls forming warm air return ducts between the elongated nozzle ports, whereby air flowing into said second passage is cooled and forced down through the nozzle ports toward food on the belt, cools the food, and returns through said ducts and between said wall means forming said second passage and the insulated passage.

9. The apparatus of claim 8, in which said third wall means further comprise a depending wall portion hinged to each of said downwardly divergent walls for movement about an axis parallel to said nozzle ports, and adjustable means connected to said wall portions for controlling the size of said nozzle ports to control the rate of flow, nozzle exit speed, direction and temperature of the air.

10. The apparatus of claim 9, further comprising cyclical drive means connected to said adjustable means for periodically moving said depending walls forward and backward along the path of movement of food on said belts.

11. The apparatus of claim 10, in which said cyclical drive means comprises speed control means for moving said depending walls at a first speed in the direction of movement of said belts and at a second and lower speed against the direction of movement of said belts to produce a relatively constant food contact air speed.

12. Deep freezing apparatus for producing hard frozen, individual, dry pieces of food from moist pieces of unfrozen food having a relatively high moisture content, said apparatus comprising, first wall means forming an insulated passage extending from an entrance end to an exit end, a series of conveyors located in said passage in sequentially adjacent relationship to convey pieces of food from said entrance end to said exit end, said conveyors comprising a first endless belt conveyor located in said passage adjacent said entrance end, said first conveyor comprising a first endless belt of insulating material, drive means connected to said first belt for driving it at a first speed, first cold air refrigerating means located in said passage above said first belt for producing cold air and directing it toward said belt, said cold air being produced at a temperature sufficiently low to freeze the outer surface of pieces of unfrozen food, the rest of said conveyors comprising endless belts of metal and means for driving said metal belts at a speed lower than the speed of said first belt, and additional cold air refrigerating means in said passage above said metal belts for producing and directing cold air toward said metal belts.

13. The apparatus of claim 12, in which said cold air refrigerating means each comprises second wall means defining a passage having an exit end above and confronting the associated belt, an air pump in said passage to force air toward the belt, air cooling means in said passage, and a series of nozzles having elongated parallel ports extending normal to the direction of movement of food on the belts, said nozzles being formed by third wall means extending across the exit end of said vertical passage, said wall means comprising spaced pairs of adjacent, connected downwardly divergent adjustable walls forming warm air return ducts between the elongated nozzle ports, whereby air flowing into said passage is cooled and forced down through the nozzle ports toward food on the belt, cools the food, and returns through said ducts and between said second wall means and the insulated passage.

14. The apparatus of claim 13, further comprising adjusting means connected to said adjustable walls for controlling the size and direction of said nozzle ports to control the rate of flow, nozzle exit speed, direction and temperature of the air, and cyclical drive means connected to said adjustable means for periodically moving said depending walls forward and backward along the path of movement of food on said belts.

15. Deep freezing apparatus, for producing hard frozen, individual dry pieces of food from moist pieces of unfrozen food having a relatively high moisture content, said apparatus comprising, first wall means forming an insulated passage extending from an entrance end to an exit end, a series of conveyors located in said passage in sequentially adjacent relationship to convey pieces of food from said entrance end to said exit end, said conveyors comprising a first endless belt conveyor located in said passage adjacent said entrance end, said first conveyor comprising a first endless belt of insulating material, first cold air refrigerating means located in said passage above said first belt for producing cold air and directing it toward said belt, said cold air being produced at a temperature sufficiently low to freeze the outer surface of pieces of unfrozen food, the rest of said conveyors comprising endless belts of metal, and additional cold air refrigerating means in said passage above said metal belts for producing and directing cold air toward said metal belts.

16. The apparatus of claim 15, in which said cold air refrigerating means each comprise second wall means forming a second passage terminating in an exit end confronting the associated belt, an air pump in said second passage to force air toward the belt, air cooling means in said second passage, and a series of adjustable nozzles having elongated nozzle ports extending normal to the direction of movement of food on the belt, said nozzles extending horizontally across the exit end of said second passage, whereby air flowing into said second passage is cooled and forced through the nozzle ports toward food on the belt, cools the food, and returns through said ducts and between said second passage and the insulated passage.

17. The apparatus of claim 16, further comprising adjusting means connected to said adjustable nozzles for controlling the size and direction of said nozzle ports to control the rate of flow, nozzle exit speed, direction and temperature of the air.

18. The apparatus of claim 17, further comprising cyclical drive means connected to said adjusting means for periodically moving said depending walls forward and backward along the path of movement of food on said belts.

References Cited

UNITED STATES PATENTS

| | | | |
|---|---|---|---|
| 2,402,921 | 6/1946 | Sharpe | 62—380 X |
| 3,036,385 | 5/1962 | Russell | 34—160 |
| 3,173,276 | 3/1965 | Martin | 62—380 |
| 3,218,727 | 11/1965 | Lind | 62—380 X |
| 3,267,585 | 8/1966 | Futer | 34—20 |
| 3,267,690 | 8/1966 | Gerrish | 62—380 |

ROBERT A. O'LEARY, *Primary Examiner.*

W. E. WAYNER, *Assistant Examiner.*